United States Patent [19]

Palmer et al.

[11] 3,969,756

[45] July 13, 1976

[54] COLOR-PICTURE/MULTICHANNEL-SOUND RECORD AND RECORDING/PLAYBACK APPARATUS AND METHODS THEREFOR

[75] Inventors: Richard Claxton Palmer, Blawenburg; Jon Kaufmann Clemens, Skillman, both of N.J.

[73] Assignee: RCA Corporation, New York, N.Y.

[22] Filed: Nov. 12, 1974

[21] Appl. No.: 522,811

[52] U.S. Cl. .................................... 358/4; 360/33; 178/DIG. 23
[51] Int. Cl.² .......................................... H04N 5/82
[58] Field of Search ............ 358/4; 360/33; 178/5.6, 178/5.8, DIG. 23

[56] References Cited
UNITED STATES PATENTS

| | | | |
|---|---|---|---|
| 3,273,260 | 9/1966 | Walker | 178/DIG. 23 |
| 3,484,544 | 12/1969 | Walker | 178/DIG. 23 |
| 3,659,041 | 4/1972 | Kitaoka | 178/DIG. 23 |
| 3,775,554 | 11/1973 | Hjortzberg | 358/1 |
| 3,842,194 | 10/1974 | Clemens | 179/100.4 M |
| 3,872,498 | 3/1975 | Pritchard | 358/21 |
| 3,893,163 | 7/1975 | Wessels | 358/4 |
| 3,906,152 | 9/1975 | Hoogendijk | 360/33 |
| 3,911,476 | 10/1975 | Keizer | 358/4 |

FOREIGN PATENTS OR APPLICATIONS 2,133,130   1/1973   Germany

*Primary Examiner*—Howard W. Britton
*Attorney, Agent, or Firm*—Eugene M. Whitacre; William H. Meagher

[57] ABSTRACT

Color picture information is recorded on a video disc together with multiple channels of sound information (e.g., a pair of stereo sound signal components). Each audio signal to be recorded modulates the frequency of a respectively different sound carrier over a respectively different low frequency deviation range. Picture carrier waves are frequency modulated in accordance with composite color video signals, including a luminance component and a chrominance component (the latter comprising a modulated color subcarrier buried in the midband of the luminance component). The duty cycle of the modulated picture carrier waves is varied in accordance with the sum of the respective frequency modulated sound carriers to form a recording signal. The color subcarrier frequency, and the respective sound carrier center frequencies correspond to different odd multiples of half the line frequency. The sound carrier deviation ranges lie below (but near) the band occupied by the chrominance component, and below the first order sideband of the modulated picture carrier. The black-representative picture carrier frequency is separated from the chrominance band upper boundary by a frequency substantially corresponding to the highest video signal frequency. A disc record is developed with a pattern of depressed and non-depressed regions in its groove bottom representative of the recording signal. Playback apparatus recovers from the disc record a playback signal of the general form of the recording signal. Respective bandpass filters, with passbands centered about the respective sound carrier deviation ranges, select playback signal portions for application to respective sound carrier FM demodulators. Additional filter, with passband encompassing picture carrier deviation range and first order sideband therefor, supplies input to picture carrier FM demodulator. Video signal processing circuits, responsive to output of picture carrier FM demodulator, include respective comb filters for selectively passing respective luminance and chrominance components.

19 Claims, 5 Drawing Figures

COLOR-PICTURE/MULTICHANNEL-SOUND RECORD AND RECORDING/PLAYBACK APPARATUS AND METHODS THEREFOR

The present invention relates generally to a novel color-picture/multichannel-sound record, and to novel recording and playback apparatus and methods therefor, and particularly to a novel disc record structure permitting high density storage of related luminance, chrominance and multi-channel sound information, to novel recording apparatus and methods for translating such related information to disc storage form, and to novel playback apparatus and methods for recovering and separating such stored information.

In U.S. Pat. No. 3,842,194, issued Oct. 15, 1974 to Jon K. Clemens, video disc recording and playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable; the capacitance variations are sensed to recover the recorded information.

In one particularly successful format employed for the groove bottom information track in practice of the Clemens invention, depressed areas extending across the groove bottom alternate with non-depressed areas, with the frequency of alternation varying with the amplitude of video signals subject to recording. The form of the recorded signal is thus a carrier frequency modulated in accordance with video signals. In a preferred technique for recording the information on a video disc master, an electron beam subject to intensity modulation in accordance with FM carrier signals, impinges upon electron beam sensitive material in the master disc groove bottom, so that subsequent development leaves the desired relief pattern in the groove bottom.

Where it is desired to provide capability for color image reproduction from the information recorded on the video disc, one straightforward approach is to frequency modulate the picture carrier with a composite color television signal of the familiar NTSC format (employed for color television broadcasting in such countries as the United States and Japan). In the NTSC format, coloring information is added to a brightness-representative video signal through the use of a color subcarrier (at a frequency of 3.579545 MHz., hereinafter referred to as 3.58 MHz. for the sake of simplicity) which is effectively phase modulated in accordance with hue and amplitude modulated in relation to saturation. The color subcarrier signal represents the sum of 3.58 MHz. subcarrier wave of a first phase amplitude modulated in accordance with a first color-difference signal and a 3.58 MHz. subcarrier wave of a second phase, in quadrature with the first phase, amplitude modulated in accordance with a second color difference signal.

When the unmodified NTSC format is employed for the signals used to frequency modulate the carrier in the above-described video disc system, several difficulties are encountered. Certain practical limitations in the recording process as to the highest instantaneous frequency readily recordable lead to limitations on how high in the frequency spectrum one may locate the frequency deviation range to be associated with modulation of the picture carrier. The relatively high frequency location of the color subcarrier and its sidebands in the NTSC format thus results in a relatively low frequency deviation to modulation frequency ratio which tends to lower the signal-to-noise ratio attainable for the color signals. An additional serious problem is the development of undesired beats when using the unmodified NTSC format with its high frequency location for color information.

To appreciate the nature of the aforesaid beat problem one must recognize that a difficulty encountered with the described recording of an FM carrier signal in the disc groove bottom is the tendency for a baseband signal to accompany the recorded FM carrier signal. Illustrative of a cause for such accompaniment is a tendency for the average depth of a slot to vary slightly in proportion to the closeness of spacing of slots, i.e., in proportion to the instantaneous frequency recorded, whereby there is a component of capacitance variation sensed during playback that varies in accordance with the baseband video signal employed to frequency modulate the picture carrier.

With baseband signal frequencies thus liable to appear in signals recovered from the disc during playback, beats can occur between the baseband signals and the FM signals. When an unmodified NTSC format placing the color subcarrier and its sidebands at the high end of the base-band, color signal presence can result in production of annoying beats at frequencies falling within the video passband of the player's FM demodulator output, unless the range of instantaneous frequencies occupied by the FM signal is pushed considerably above the high end of the baseband. In view of the previously noted practical limitations on the highest instantaneous frequency conveniently recordable, location of the picture carrier deviation range appreciably higher than the band of frequencies occupied by the baseband signal in an unmodified NTSC format is not readily available as a solution to the noted beat problems.

A satisfactory and readily realizable solution to the noted beat problems (as well as the noted signal-to-noise ratio problem) may be provided, however, through use in the color signal recording and recovery systems of the "buried subcarrier" approach disclosed in the copending application, Ser. No. 350,777, of Dalton H. Pritchard, filed Apr. 13, 1973, and entitled "COLOR INFORMATION TRANSLATING SYSTEMS" now U.S. Pat. No. 3,872,498. Pursuant to such principles, a modulated color subcarrier (which may, for example, be of the general form employed in the NTSC system) is not placed at the high end of the luminance signal video band as in the NTSC system, but rather is buried within the video band, i.e., with the color subcarrier frequency chosen to be significantly lower than the NTSC subcarrier frequency value of 3.58 MHz., an illustrative choice being in the vicinity of 1.53 MHz., with the color subcarrier sidebands extending ± 500 KHz. thereabout and with the luminance signal band extending well above the highest color subcarrier sideband frequency (to 3 MHz., for example).

The precise frequency of the subcarrier is chosen to be offset from a multiple of the line frequency ($f_H$) associated with the video signal by a fraction of the line frequency (preferably by ($f_H/n$), where n is a small integer greater than one). A particularly advantageous offset choice is a half line frequency ($f_H/2$) offset, although other offset choices may be appropriate under special circumstances (as, for example, where a PAL form is chosen for the subcarrier, and a quarter line frequency $-f_H/4$ — offset is suitable). An illustrative subcarrier frequency choice incorporating an $f_H/2$ offset is ($195/2 f_H$ (or approximately 1,534,091 Hz., when the line frequency corresponds to the United States standard for color television broadcasting of 15,734.26 Hz.).

To avoid annoying crosstalk effects the luminance signal is comb filtered over the band of frequencies which is to be shared with the subcarrier and its sidebands; i.e., effectively a series of troughs are developed in the frequency spectrum of the luminance signal in which the subcarrier components may be buried. Additionally, it is desirable that the modulated color subcarrier signal ("chrominance signal") is also comb filtered (in a complementary manner to that employed for the luminance signal) to effectively confine the chrominance signal to components that will fall in the troughs of the frequency spectrum of the comb filtered luminance signal. With the illustrative choice of half line frequency offset, the appropriate comb filter characteristic to be employed in preparing troughs in the luminance signal spectrum is one with recurring peaks at multiples of line frequency and recurring nulls at odd multiples of half the line frequency; the appropriate comb filter characteristic for the chrominance signal is the complement (with recurring peaks at odd multiples of half the line frequency and recurring nulls at multiples of line frequency).

By the illustrative location of the subcarrier at approximately 1.53 MHz., one may provide a reasonable bandwidth for the color sidebands (e.g., ± 500 KHz. about the subcarrier frequency, $f_s$ ) and yet retain a moderately wideband (e.g., 0–1 MHz.) at the low end of the signal spectrum which will be free of chrominance signal components.

When luminance signals and chrominance signals, prepared in the above described manner, are combined, a composite signal is formed which may be recorded in the previously mentioned video disc recording system and subsequently recovered with substantial avoidance of the previously mentioned beat problems and with reasonable assurance of an acceptable signal-to-noise ratio. With provision of appropriate comb filter apparatus in the video disc player, the chrominance and luminance signal components occupying the shared band (e.g., approximately 1–2 MHz.) may be accurately separated from each other for application to suitable utilization circuitry.

In subsequent use of the chrominance signal components to supply the coloring information for an image reproduction, spurious coloring effects due to midband luminance components are substantially avoided, the avoidance being due to the described judicious application of comb filtering techniques. Also, in subsequent use of the luminance signal components to supply the brightness information for an image reproduction, spurious dot patterns due to the brightness effects of the midband chrominance signal components are substantially avoided, the avoidance being due to the described judicious application of comb filtering techniques.

While the foregoing application of the "buried subcarrier" principles of the Pritchard application to the disc system of the Clemens patent results in a satisfactory arrangement for the recording, storage and playback of related luminance and chrominance information so that the display of recorded color pictures may be effected, a further problem must be confronted to satisfy the normal desire to accompany the display of recorded color pictures with the reproduction of related recorded sound information.

In one initially considered approach to the recording/reproduction of accompanying sound information, accompanying audio signals were caused to frequency modulate a high frequency sound subcarrier, with the frequency of the subcarrier chosen to be sufficiently higher than the highest video frequency to be recorded that the sound subcarrier deviation range and associated sidebands fell above the band of frequencies occupied by the composite video signal (e.g., fell above 3 MHz.). Addition of the high frequency FM sound subcarrier signal components to the composite video signal provided a composite sound/video signal which was, in turn, used to frequency modulate a main carrier; after suitable clipping and processing, the resulting signal was applied to recording apparatus, such as the SEM recorder described in the aforesaid Clemens patent. In playback, upon recovery of the FM main carrier signal, and demodulation thereof to obtain the composite sound/video signal, filtering was then employed to separate the high frequency sound subcarrier components from the lower frequency video components. The separated sound subcarrier components, after additional amplification and limiting, were applied to a second FM demodulator to recover the baseband sound signal.

While accompanying sound recording/reproduction may be realized by the above-described high frequency sound subcarrier techniques, difficulties accompanying such realization (particularly in view of the previously discussed practical limitations on the location of the main carrier frequency deviation range) are that, (1) the high frequency sound subcarrier produces beats and noisy edges in the picture, and (2) the signal-to-noise ratio of the demodulated sound subcarrier suffers because of the relatively low frequency deviation to modulation frequency ratio associated with its modulation of the main carrier.

It will be noted that the above-described difficulties are of similar character to those noted previously as undesirably accompanying use of a high frequency chrominance subcarrier (e.g., when recording composite color video signals of unmodified NTSC format).

In the copending application of Eugene O. Keizer, Ser. No. 441,069 filed on Feb. 11, 1974, now U.S. Pat. No. 3,911,476, techniques are disclosed for achieving accompanying sound recording and reproduction without the difficulties noted as being associated with the high frequency sound subcarrier approach. In disc recording apparatus as disclosed in the Keizer application, accompanying audio signals are caused to frequency modulate a low frequency sound carrier over a low frequency deviation range. The output of the sound carrier modulator is added to the output of a picture carrier modulator. In the picture carrier modulator, a composite color video signal (including luminance signals occupying a given band of frequencies, and chrominance signals appearing as sideband components of a modulated chrominance subcarrier interleaved with luminance signal components in an intermediate region of the given band) is caused to frequency modulate a high frequency picture carrier over a high frequency deviation range. The peak-to-peak amplitude of the sound modulator output is held at a level which is small relative to the peak-to-peak amplitude level of the picture modulator output, with an illustrative level ratio being 1:7. The resultant of combining the respective modulated carriers is applied to clipping means to develop an output which may be conveniently described as an impulse train having a repetition rate corresponding to the frequency of the frequency modulated picture carrier, and having a "duty cycle" which varies cyclically about a 0.5 value with the frequency of said cyclic variation of duty cycle corresponding to the frequency of the frequency modulated sound carrier.

The duty cycle modulated output of the clipping means is amplified and process for application to suitable recording apparatus. Illustratively, the recording apparatus is of the SEM recorder type described in the aforementioned Clemens patent, with the intensity of the scanning electron beam controlled in response to the signal developed by the clipping means. As successive groove bottom regions of a grooved disc master, coated with a layer of electron beam sensitive material (forming a smoothly curved surface for the groove), pass through the electron beam path, the regions are exposed in a pattern determined by the intensity controlling signal such that, upon subsequent development, a pattern of geometry variations corresponding to the exposure pattern is established in the groove bottom of the disc master.

A stamper disc may be derived from the recording master, as by techniques described in the Clemens patent, and utilized, in conventional record stamping machinery, to produce a plurality of replica discs of thermoplastic material, each replica disc having a surface groove, in the bottom of which appears an information track comprising geometric variations in the pattern established in the groove bottom of the recording master. The grooved surface of each replica disc is then covered, as described, for example, in the Clemens patent, with a layer of conductive material and an outer coating of dielectric material over-lying the conductive layer. Ther respective thicknesses are sufficiently small so that the conductive layer and overlying dielectric coating follow the contours of the groove and the groove bottom geometry variations therein.

Through application of the principles of the Keizer system to the recording process, as illustratively described above, the structure of each coated replica disc resulting therefrom is as follows: The groove bottom geometry variations comprise alternations between a first cross-sectional shape for the groove in which the coated groove bottom and adjacent coated groove walls define a a continuous smooth curve, and a second cross-sectional shape in which the groove bottom is depressed relative to the groove bottom level associated with the first cross-sectional shape. The rate at which the alternations repeat along a given arcuate dimension of a groove convolution varies along the groove in accordance with the amplitude of a composite color video signal including components representative of the luminance and chrominance of the scanned image that has been subject to recording; the chrominance-representative components share with luminance-representative components, in interleaved fashion, a midband portion of the band of frequencies associated with the composite color video signal, in a realization of the aforementioned buried subcarrier approach. The ratio of the longitudinal (along the groove) dimension of a depressed groove bottom region and the longitudinal dimension of an adjacent non-depressed groove bottom region varies along the groove in cyclical fashion about a value of unity. The rate at which the cyclic ratio variation repeats along a given arcuate dimension of a groove convolution varies in accordance with the amplitude of an audio signal representative of the recorded sound accompaniment for the recorded image-representative signals.

In many instances, it may be desired to accompany the color pictures recorded on a video disc with multiple channels of sound information (e.g., a stereo sound accompaniment; a bilingual sound track; etc.). Pursuant to the principles of the present invention, the duty cycle modulation approach outlined above may be adapted to provide the desired multichannel sound accompaniment. Each audio signal to be recorded modulates the frequency of a respectively different sound carrier over a respectively different low frequency deviation range, and the duty cycle of picture carrier waves (frequency modulated in accordance with the composite video signals to be recorded) is varied in accordance with the sum of the respective frequency modulated sound carriers.

As explained in detail in a copending application, Ser. No. 522,812, of Richard C. Palmer, entitled "Video Disc Recording Apparatus And Methods" and concurrently filed herewith now U.S. Pat. No. 3,934,263, various practical problems encountered in recording and playback aspects of video disc system hereinabove described may combine to introduce the possibility of sound carrier interference in the picture display when the duty cycle modulation approach is employed. Additionally, analysis of the noise characteristics of the described video disc system has shown that noise, both of a background type (leading to "hiss" in sound reproduction) and of an impulse type (leading to "ticks" and "pops" in sound reproduction), is encountered to different degrees at different baseband spectral locations. Moreover, recording process problems, of the type that lead to the presence of a baseband composite video component in the signal recovered during disc playback, give rise to the possibility of composite video component interference with sound performance. Other recording process limitations that determine the highest instantaneous picture carrier frequency reasonably amenable to recording may engender problems of picture carrier sideband component interference with sound performance.

In the light of consideration of the aforementioned problems, sound carrier deviation range location and center frequency choice, pursuant to the principles of the present invention, bear particular relationships to other recording signal parameters, the relationships being chosen to obtain a desirable balance among such performance criteria as audio signal-to-noise ratio, visibility of sound interference in brightness and color aspects of picture display, video interference in sound reproduction, et al.

Pursuant to an illustrative application of the principles of the present invention to the provision of a pair of sound channels for achievement of stereo sound accompaniment, the sound carrier center frequency choices are 715.909 KHz. and 904.720 KHz., and deviation range selection is ±50 KHz. about each center frequency, for a system wherein the related recorded signal parameters are: line scan frequency ($f_H$) of 15,734.26 Hz; video passband of 0–3 MHz.; chrominance signal of 1 MHz. bandwidth in buried subcarrier format, representing color-difference signal pair (passband: 0–500 KHz. each) modulation of quadrature components of color subcarrier ($f_c$) at frequency of 1,534,091 Hz. (corresponding to $(195/2) f_H$), and occupying a band of approximately 1–2 MHz.; picture carrier deviation range between 4.3 MHz. (sync tip representative) and 6.3 MHz. (peak white representative) with 5.0 MHz. representative of picture black level.

It will be noted that the center frequency choices of 715.909 KHz. and 904.720 KHz. have the following characteristics: (a) both fall outside the 1–2 MHz. band occupied by the chrominance signal; (b) the third harmonic of each also falls outside the chrominance band; (c) each is separated from the lowest picture carrier deviation range frequency by a frequency falling above the video passband; (d) the respective center frequencies correspond to odd multiples of half the line frequency ($(91/2) f_H$ and $(115/2) f_H$, respectively); (e) both fall outside the first order sideband of the frequency modulated picture carrier; (f) the pair locations are as close to the upper limit of the chrominance-free band of 0–1 MHz. as reasonable guard band practice will allow. The advantages of the noted characteristics are recited below.

Avoidance of overlap between the sound deviation ranges and the chrominance band ensures that sound carrier appearance as an interfering signal in the output of the player's picture carrier FM demodulator will not lead to disturbance of the picture display coloring. That is, the appropriate bandpass filtering in the player's chrominance signal processing circuits will reject the fundamental frequency component of such an interfering signal. Rejection of third harmonic components of the interfering carriers will also be effected by the chrominance channel bandpass filter, when the spectral locations are chosen as indicated above. While second harmonic components of such an interfering signal will fall within the chrominance band, their interfering effect will be lessened by the operation of the chrominance channel's comb filter (which will, inter alia, fully reject each sound carrier center frequency).

Separation of both deviation ranges from the nearest (i.e., lowest) picture carrier deviation range frequency by frequencies falling above the video passband ensures that beats between the sound and picture carriers may be precluded from interfering with picture display. That is, appropriate low pass filtering of the video output of the player's picture carrier FM demodulator will reject beats between the sound and picture carriers.

Choice of sound carrier center frequencies at respectively different odd multiples of half the line frequency eases the problem of sound carrier interference in the brightness aspects of the picture display in several ways. The visibility threshold for the interference is effectively raised by choice of the indicated relationship to line frequency by virtue of resultant interlacing of the dots of the displayed interference pattern. The interlacing effect is maximum during silent periods when the sound carrier rests at its center frequency; the effect is less, but still significant, when the sound carrier is varied about its center frequency by audio modulation.

A further contribution to easing of the sound carrier interference problem may be realized, when the above-noted relationship to line frequency is employed for the sound carriers, by judicious widening of the band of effective operation for the player's luminance comb filter. That is, a comb filter having rejection notches recurring at odd multiples of half the line frequency is normally provided in the player's luminance signal processing circuitry for luminance/chrominance separation purposes (i.e., to remove buried subcarrier sideband components from the luminance signal). For such separation purposes, the luminance signal combing need only extend over the band (1–2 MHz.) that is shared with the chrominance signal. However, by continuing the luminance signal combing below the chrominance band boundary (1 MHz.) to a sufficient degree to encompass the respective sound carrier deviation ranges, the luminance comb filter may serve to: (a) bar passage of an interfering sound carrier to the picture display device during silent periods when the sound carrier is at center frequency; and (b) lessen response to the interference during periods of audio modulation, as the carrier frequencies swing through rejection notches.

Location of the respective sound carrier deviation ranges in spectral regions spaced below the lower boundary (e.g., 1.3 MHz.) of the first order lower sideband of the modulated picture carrier lessens the likelihood that interference from picture carrier sideband components will cause a noticeable disturbance of sound reproduction. That is, appropriate bandpass filtering of the respective inputs to the player's sound carrier FM demodulators will block passage of all first order sideband components of the modulated picture carrier. In only rare instances of unusual content will second or higher order sideband components of the modulated picture carrier be likely to appear in the vicinity of the sound carriers with sufficient amplitude to be noticeable sources of interference.

Use of the upper end of the chrominance-free, 0–1 MHz. baseband region for sound carrier deviation range location is preferable to the lower end for enhanced signal-to-noise performance in sound reproduction, because of the noise characteristics of the disc system. Noise spectrum analysis has shown that record noise (which can be a consequence of a variety of causes, arising in connection with almost any step of the various recording and replicating processes) decreases significantly with frequency over the noted baseband region.

A further advantage of the aforesaid upper end (close to the chrominance band) location for the sound carrier deviation ranges, is realized where advantage is taken in the player's luminance signal processing circuitry of comb filter reduction of sound interference, as previously described. That is, downward extension of the luminance channel's chrominance-rejecting comb filter action to encompass the sound deviation ranges imposes less serious restrictions on vertical detail rendition when the sound carrier deviation ranges have the noted upper end locations close to the chrominance band boundary.

When the sound carrier deviation ranges occupy the aforesaid upper end locations, a reduction in potential interference in a sound reproduction from baseband video components will accompany a reasonable degree of extension (downward in frequency) of the comb filter action of the recorder's luminance comb filter. Such a reduction factor will counterbalance to a significant degree the opposite effect of video pre-emphasis. A net improvement in freedom from baseband video component interference, over alternative lower end locations for the sound carrier deviation ranges, may then be realized for typical scenes, in view of the energy distribution, decreasing with frequency over the range of interest, for video signals representative of statistically average scenes.

Through application of the principles of the present invention, exemplified above, the recording of color picture information with multichannel sound accompaniment, the storage of such information in disc form and the recovery and separation of such information upon disc playback, may be carried out with satisfactory performance standards in both picture and sound aspects of reproductions of the recorded material.

Objects and advantages of the present invention will be recognized by those skilled in the art upon a reading of the following detailed description and an inspection of the accompanying drawings in which:

FIG. 1a illustrates, in a broken-away perspective view, a portion of a coated replica disc derived from a master disc recorded by the apparatus of FIG. 1 pursuant to the principles of the present invention;

Figure 3:
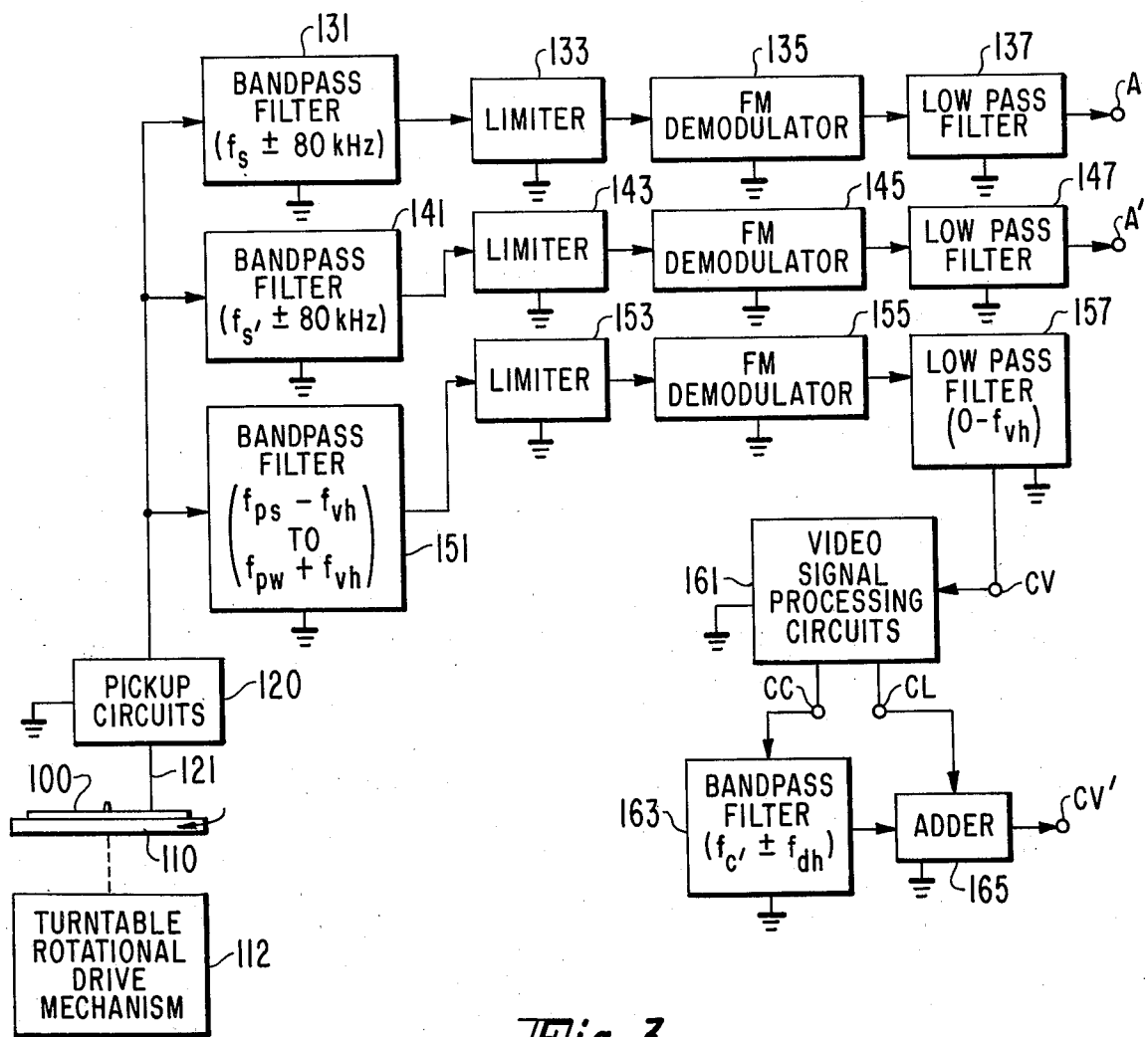
Figure 4:
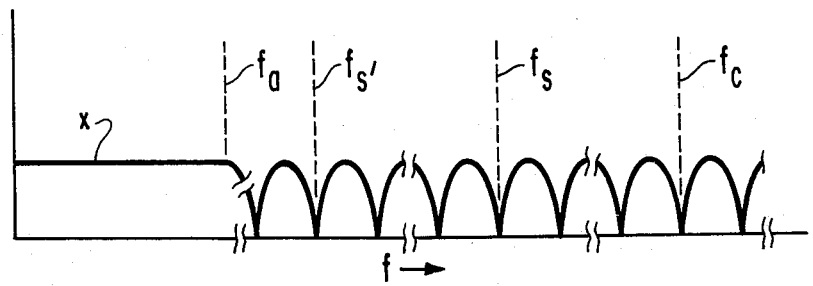

FIG. 3 illustrates, in block diagram representation, playback apparatus for recovering from a disc record color picture information and accompanying multichannel sound information, in accordance with an embodiment of playback aspects of the present invention; and FIG. 4 illustrates graphically a frequency response characteristic that may be advantageously employed in the playback apparatus of FIG. 3 pursuant to a specific embodiment of the playback aspects of the present invention.

Figure 1:
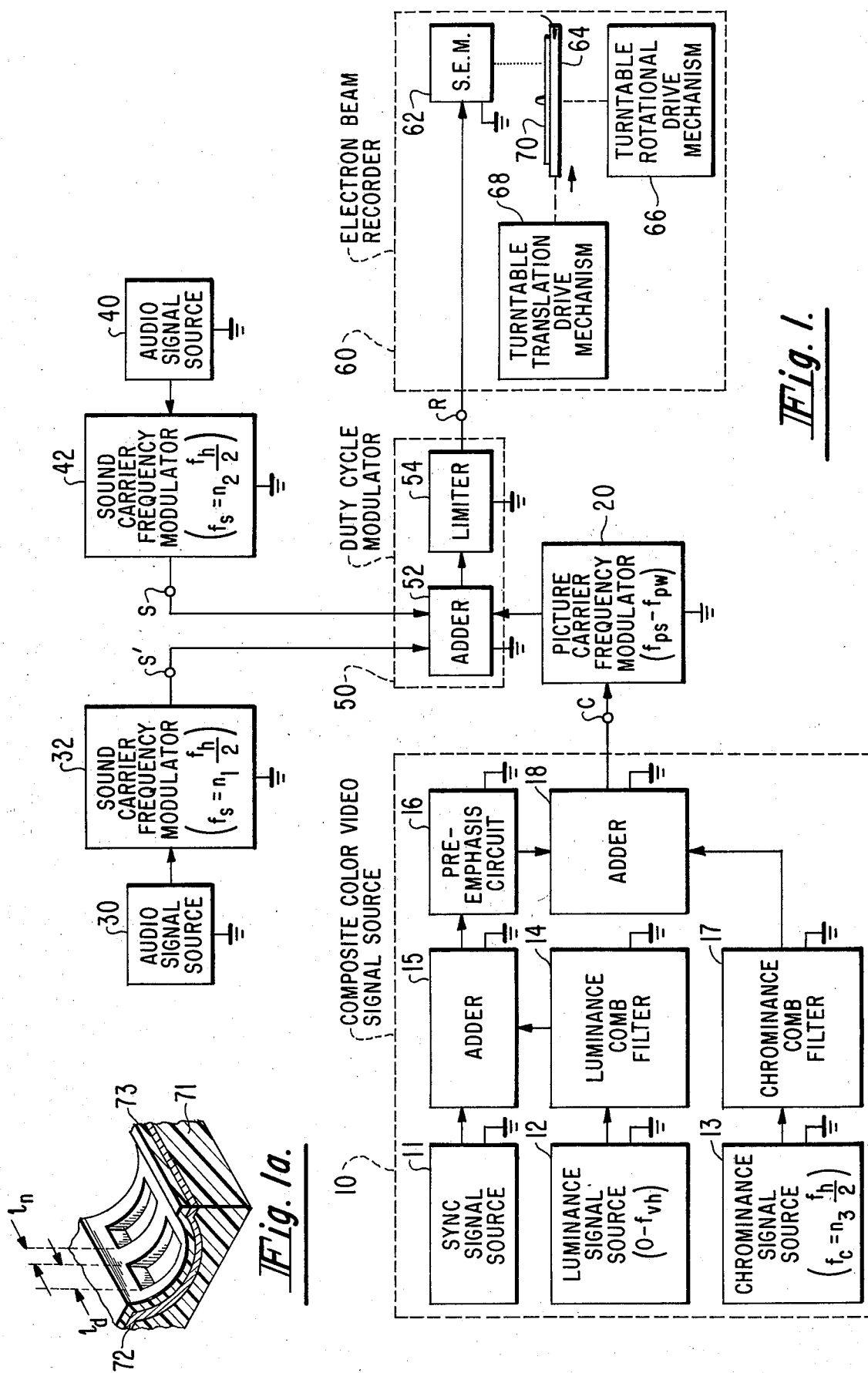
FIG. 1 illustrates, in block diagram representation, apparatus for recording in disc form color picture information with a multichannel sound accompaniment in accordance with an embodiment of recording aspects of the present invention.

In FIG. 1 a trio of related signal sources 10, 30, and 40 are shown, with source 10 providing composite color video signals representative of color pictures to be recorded, and with sources 30 and 40 providing respective audio signals representative of a multichannel sound accompaniment for the color pictures. Illustratively, sources 30 and 40 provide respective "left" and "right" channel audio signals suitable for use in effecting a stereo sound reproduction, with each audio signal limited to a bandwidth of 20 Hz. – 15 KHz, and subject to preemphasis with a 75 microsecond time constant.

The audio signal developed by source 30 is applied to a first sound carrier frequency modulator 32 to develop frequency modulated sound carrier waves at modulator output terminal S'. Illustratively, modulator 32 comprises a frequency modulated oscillator having a resting frequency corresponding to a selected odd multiple ($n_1$) of half the line frequency ($f_H$) of the video signals provided by source 10. A specific example of a desirable choice for $n_1$ is the integer 91, resulting in a center frequency ($f_{s'}$) for the FM sound carrier waves at terminal S' of approximately 715.909 KHz., when the line frequency corresponds to the United States standard for color television broadcasting of 15,734.26 Hz.

A satisfactory deviation range for the instantaneous frequency of the modulated sound carrier waves provided by modulator 32 comprises $f_{s'}$ ± 50 KHz.

The audio signal developed by source 40 is applied to a second sound carrier frequency modulator 42 to develop additional frequency modulated sound carrier waves at modulator output terminal S. Illustratively, modulator 42 comprises a frequency modulated oscillator having a resting frequency corresponding to a different selected odd multiple ($n_2$) of ($f_H/2$). A specific example of a desirable choice for $n_2$ is the integer 115, resulting in a center frequency ($f_s$) for the FM sound carrier waves at terminal S of approximately 904.720 KHz., when the line frequency is at the aforesaid value of 15,734.26 Hz. A satisfactory deviation range for the instantaneous frequency of the modulated sound carrier waves provided by modulator 42 comprises $f_s$ ± 50 KHz.

The composite color video signal source 10 illustratively comprises a trio of correlated signal sources: sync signal source 11, luminance signal source 12, and chrominance signal source 13. The signals provided by source 11 comprise deflection synchronizing signals of conventional format, while the signals provided by source 12 comprise video signals representative of the luminance of the color pictures to be recorded, limited in bandwidth to the band between 0 and $f_{vh}$, with 3.0 Mhz. an illustrative choice for the highest luminance signal frequency ($f_{vh}$).

The chrominance signal provided by source 13 is illustratively of the buried subcarrier type discussed in the aforesaid Pritchard patent, with the buried color subcarrier frequency ($f_c$) of a value corresponding to ($n_3$ ($f_H/2$)), where $n_3$ is an odd integer. An advantageous choice for the integer $n_3$ is 195, resulting in the color subcarrier frequency ($f_c$) being approximately 1,534,091 Hz. (when $f_H$ corresponds, as aforesaid, to 15,734.26 Hz.). The modulated color subcarrier occupies a band of frequencies between 1.0 and 2.0 MHz., and represents the resultant of summing products of amplitude modulation of different, quadrature-related, phases of the subcarrier ($f_c$) with respectively different color-difference signals (each occupying a band of 0–500 KHz.).

Pursuant to the approach outlined in the afore-said Pritchard patent, the luminance signal provided by source 12 is comb filtered over the band of frequencies which is to be shared with the subcarrier and its sidebands to develop a series of troughs in the frequency spectrum of the luminance signal in which the subcarrier may be buried. Additionally, the chrominance signal provided by source 13 is also comb filtered (in a complementary manner to that employed for the luminance signal) to substantially confine the chrominance signal to components that will fall in the troughs of the frequency spectrum of the comb filtered luminance signal. The desired comb filter characteristic for the luminance signal, with recurring nulls at odd multiples of half the line frequency, is provided in the FIG. 1 apparatus by the luminance comb filter 14, while the desired comb filter characteristic for the chrominance signal, with recurring nulls at even multiples of half the line frequency, is provided by the chrominance comb filter 17.

The output of luminance comb filter 14 is combined with the output of sync signal source 11 in an adder 15, and the sum is applied to a pre-emphasis circuit 16. An illustrative pre-emphasis characteristic that may be imparted to the adder output by the pre-emphasis circuit is a response level rise with frequency of 6db per octave commencing at 300 KHz. The output of the pre-emphasis circuit 16 is combined with the output of the chrominance comb filter 17 in an adder 18 to form the composite color video signals which appear at the adder output terminal C.

The signals at terminal C are applied to a picture carrier frequency modulator 20 to develop frequency modulated picture carrier waves. Illustratively, the modulator 20 is a frequency modulated oscillator having an instantaneous output frequency which is varied over a deviation range of 4.3 MHz. to 6.3 MHz. by the maximum amplitude swing of the composite color video signals at terminal D, with the poling of the video signals such that the low frequency extreme ($f_{ps}$) is sync tip representative while the high frequency extreme ($f_{pw}$) is peak white representative. An intermediate instantaneous frequency ($f_{pb}$), which is illustratively 5.0 MHz., is representative of picture black level.

Duty cycle modulation of the modulated picture carrier wave output of modulator 20 in accordance with the sum of the modulated sound carrier waves appearing at terminals S' and S is carried out by a duty cycle modulator 50, which includes an adder 52 for summing the outputs of the three modulators 20, 32 and 42, and a limiter 54 for doubly clipping the sum output of adder 52.

The magnitudes of sound modulator outputs applied to adder 52 are chosen so that the peak-to-peak amplitude of their sum remains small relative to the peak-to-peak amplitude of the output of the picture carrier modulator 20, and the clipping levels in limiter 54 are separated by a spacing appreciably smaller than the peak-to-peak swing of either sound modulator output. Illustratively the peak-to-peak amplitude of each sound modulator output is set at the same level, 17db below the peak-to-peak amplitude of the output of the picture carrier frequency modulator 20. The maximum amplitude swing of the sum of the sound carrier modulator output is thereby limited to approximately two-sevenths (about 0.282) of the peak-to-peak swing of the picture carrier modulator output. A consequent duty cycle variation range for the output of limiter 54 (in the instance of a sinusoidal waveshape for the picture carrier modulator output) is approximately 0.5 ± 0.091.

The output of the duty cycle modulator 50, appearing at the limiter output terminal R, serves as the recording signal input to an electron beam recorder 60 of the scanning electron microscope (SEM) type generally described in the above-mentioned Clemens patent. In the electron beam recorder, a scanning electron microscope 62 directs a beam of electrons upon a resist-coated, curved groove bottom of a pre-grooved recording master disc 70. The disc 70 is supported by a turntable 64 which is subject to (a) rotational motion imparted by a turntable rotational drive mechanism 66, and (b) translational motion imparted by a turntable translational drive mechanism 68. The rotational and translational drives are interrelated in such a manner that the electron beam path is intercepted by successive regions along the length of the disc's spiral groove. Reference may be made to the copending application of Robert W. Jebens, et al. Ser. No. 349,775, filed on Apr. 10, 1973 and entitled "Precision Turntable Rotation In A Vacuum Atmosphere," now U.S. Pat. No. 3,943,275, for a more detailed explanation of suitable apparatus for effecting the requisite controlled motion of the turntable 64.

Illustratively, the SEM electron beam is unblanked for the duration of each positive swing of the clipped signal at terminal R, and blanked for the duration of each negative swing of the clipped signal. The sweep rate for the SEM beam is considerably higher than the highest frequency of the picture carrier deviation range, while the beam sweep amplitude and unblanked beam intensity are substantially constant. As the disc rotates at a constant speed, a pattern of successive exposed and unexposed regions is produced along the length of the groove, with the lengths thereof (along the groove) determined by the respective swing durations of the recording signal input. Assuming, for example, that the master disc groove coating is a positive resist, a subsequent development step will leave a pattern of alternating depressed and (relatively) non-depressed regions in the groove bottom corresponding to the pattern of exposed and unexposed regions, respectively.

When a stamper disc is derived (as by techniques described in the Clemens patent) from a recording master subject to recording in the manner above described, it may be utilized to impress, by conventional stamping techniques, a plurality of replica discs, whereby the groove bottom pattern of the master is duplicated in each. Coating of a replica disc thus impressed with a first layer of conductive material, and a second overlying layer of dielectric material (as in the manner suggested in the Clemens patent) prepares the replica disc for playback use. An illustration of a portion of a replica disc thus prepared is shown in perspective view in FIG. 1a.

The replica disc portion illustrated in FIG. 1a includes only a segment of a single groove convolution. The showing of the impressed disc base 71, which is preferably of a thermoplastic material, such as vinyl, is cut away below its grooved surface for ease of illustration (since the base thickness is, illustratively, several orders of magnitude greater than the surface coating thicknesses). The grooved base surface (containing the previously described pattern of alternating depressed and non-depressed regions in the groove bottom) is covered by a layer 72 of conductive material, such as copper, which is sufficiently thin so as to smoothly follow the contours of the base groove and the groove bottom depressions therein. Overlying the conductive layer 72 is a layer 73 of dielectric material, such as polystyrene also sufficiently thin so as to smoothly follow the contours of the groove and the groove bottom depressions in the material beneath it. Although not separately shown, the surface of the dielectric layer 73 may desirably be coated with a film of a lubricant of electrically insulating character, illustratively of a methyl alkyl siloxane compound form as disclosed in U.S. Pat. No. 3,833,408, issued to Dennis L. Matthies on Sept. 3, 1974.

The length of the groove segment shown in FIG. 1a is sufficient to reveal a pair of successive depressed groove bottom regions, the intervening non-depressed groove bottom region, and portions of the non-depressed groove bottom regions preceding and succeeding the depressed region pair. For illustrative purposes, the replica disc groove segment illustrated in FIG. 1a corresponds to a recording master groove segment which has been subject to exposure (in the FIG. 1 apparatus) during application of a recording signal waveform in which the sound sum has altered the picture carrier duty cycle from a 0.5 value (in a direction increasing beam-on time in the SEM 62). As a consequence, the ratio of the length ($1_d$) of an illustrated depressed region to the length ($1_n$) of an adjacent non-depressed region is, as shown, greater than unity.

The illustrated replica disc segment is cut away transverse to the groove at the left of the perspective view of FIG. 1a to reveal the groove cross-section in a non-depressed groove bottom region. As shown, the cross-sectional shape in such a region is one in which the groove bottom and adjacent groove walls define a continuous smooth curve. Desirably, the shape of the curve approximates an arc of a circle, although other shapes, such as that of a sinusoidal segment, are tolerable.

The groove bottom geometry variations which form the information track of the replica disc of FIG. 1a comprise alternations along the groove between a first cross-sectional shape in which the coated groove bottom and adjacent coated groove walls define a continuous smooth curve, and a second cross-sectional shape in which the groove bottom is depressed relative to the groove bottom level associated with the first shape. The rate at which the alternations recur along a given arcuate dimension of a groove convolution varies in accordance with the amplitude of a composite color video signal, inclusive of luminance and encoded chrominance components. Moreover, the ratio of the lengths of adjacent depressed and non-depressed groove bottom regions varies along the groove in cyclical fashion about a value of unity in accordance with the sum of a pair of different sound carriers, frequency modulated by respective audio signals.

Figure 2:
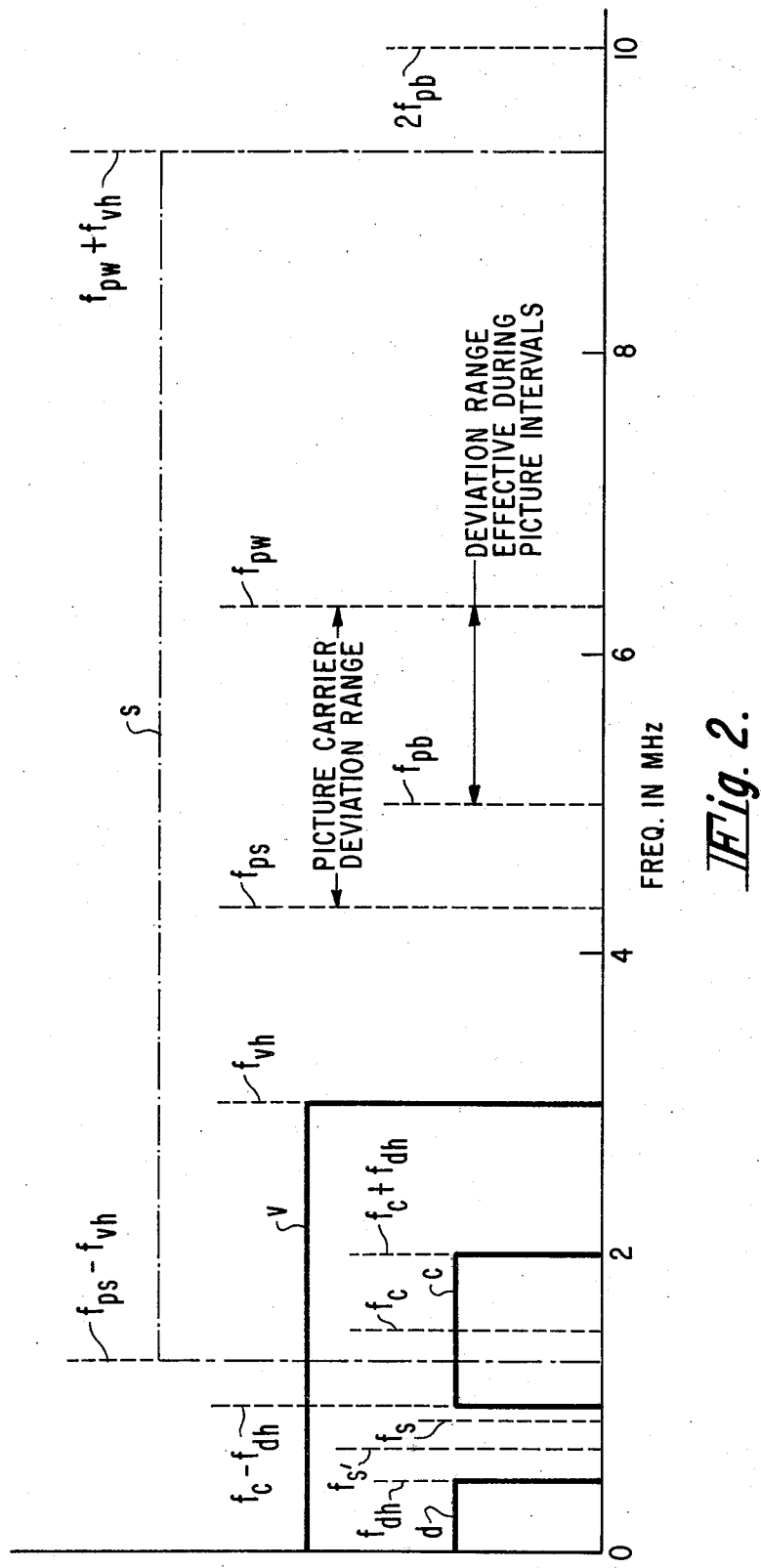
FIG. 2 illustrates graphically specific locations in the frequency spectrum of various recording signal parameters for the recording apparatus of FIG. 1, pursuant to an illustrative application of principles of the present invention.

FIG. 2 illustrates graphically the locations in the frequency spectrum for various recording signal parameters pursuant to the specific application of the principles of the present invention delineated in the description of FIG. 1. The video passband for the composite color video signals provided by source 10 is indicated by the idealized lowpass filter characteristic described by curve $v$ with the highest video signal frequency ($f_{vh}$) falling at 3.0 MHz. The passband for the chrominance signals developed by source 13 is indicated by the idealized bandpass filter chaacteristic described by curve $c$, while the passband for the respective color-difference signals employed in chrominance signal development is indicated by the idealized lowpass filter characteristic described by curve $d$. As shown, the highest color difference signal frequency ($f_{dh}$) falls at 500 KHz. With the indicated choice for color subcarrier frequency ($f_c$) lying at approximately 1.53 MHz., the chrominance band boundaries ($f_c - f_{dh}$ and $f_c + f_{dh}$) fall near 1.0 MHz. and 2.0 MHz., respectively. The respective center frequencies ($f_{s'}$, $f_s$) for the sound carrier outputs of modulators 32 and 42 are located within the upper half of the chrominance-free base-band region (0–1 MHz.) lying below the lower boundary ($f_c - f_{dh}$) of the chrominance band, the respective center frequencies being, as previously indicated, approximately 716 KHz. and 905 KHz.

In addition to showing the deviation range for the modulated picture carrier wave output of modulator 20 extending from the sync-tip representative carrier frequency ($f_{ps}$) of 4.3 MHz. to the peak-white representative carrier frequency ($f_{pw}$) of 6.3 MHz), FIG. 2 also shows the narrower deviation range therefor which is normally effective during picture signal intervals of the composite video signal output of source 10. This narrower deviation range extends between the black-representative frequency ($f_{pb}$) of 5.0 MHz. and $f_{pw}$ (6.3 MHz.).

The band of frequencies occupied by the modulated picture carrier wave output of modulator 20, inclusive of all first order sideband components, is indicated in FIG. 2 by the idealized bandpass filter characteristic described by curve $s$. The lower boundary ($f_{ps} - f_{vh}$) of this band falls at 1.3 MHz., while the upper boundary ($f_{pw} + f_{vh}$) falls at 9.3 MHz. It should be noted that both of the sound carrier center frequencies lie below ($f_{ps} - f_{vh}$), while the second harmonic of the black-representative picture carrier frequency (i.e., $2 f_{pb} = 10$ MHz.) lies above ($f_{pw} + F_{vh}$).

FIG. 3 illustrates playback apparatus, for use with a replica disc 100 of the type discussed in connection with FIG. 1a, in application of playback principles of the present invention. In the video disc player of FIG. 3, the disc 100 rests upon a turntable 110, which is caused to rotate at a predetermined, substantially constant, rotational rate by a suitable rotational drive mechanism 112. Reference may be made to the copending U.S. Pat. application Ser. No. 504,486, filed on Sept. 10, 1974 for Robert J. Hammond, et al., and entitled "A Turntable Speed Locked System," now U.S. Pat. No. 3,912,283, for a disclosure of an advantageous arrangement that may be employed for the drive mechanism 112 in order to obtain the desired controlled rotation of turntable 110.

A pickup stylus 121, received in the spiral groove of the disc 100 during the disc playback, incorporates a conductive electrode which cooperates with the disc's conductive coating (72 in FIG. 1a) to form a capacitance that varies as the groove bottom geometry variations pass beneath the stylus 121. Pickup circuits 120, electrically coupled to the electrode of stylus 121, convert the stylus-disc capacitance variations to electrical signal variations.

Illustratively, the pickup circuits 120 are of the general form disclosed in the copending U.S. Pat. application of Stephen E. Hilliker, Ser. No. 295,854, filed on Oct. 10, 1972, and entitled "Video Disc Transmission Line And Stylus RF Return Systems, " now U.S. Pat. No. 3,872,265. In such form, the stylus-disc capacitance serves as a variable element of a transmission line resonant circuit, with the transmission line formed by a conductive pickup arm (supporting the stylus) and a conductive housing partially surrounding the pickup arm. A UHF oscillator develops ultra-high frequency oscillations of substantially constant frequency and amplitude which are inductively coupled to the transmission line resonant circuit. The variable stylus-disc capacitance varies the tuning of the resonant circuit over a range of frequencies slightly shifted from the oscillator output frequency, altering the circuit response to the injected oscillations. The amplitude of the oscillations developed across the resonant circuit thus varies in accordance with the stylus-disc capacitance variations. The amplitude modulated UHF oscillations are inductively coupled to an AM detector, and the detector output is suitably amplified to form the output of pickup circuits 120. With suitable circuit parameter choices, such output will appear in the duty cycle modulated form discussed for the recording signal in connection with FIG. 1.

The output of pickup circuits 120 is supplied to a trio of bandpass filters 131, 141 and 151. Bandpass filter 131 is provided with a passband centered about the upper sound carrier center frequency $f_s$ of 904.720 KHz., and sufficiently wider than the upper sound carrier's deviation range (e.g., extending ± 80 KHz. about $f_s$) as to ensure passage of all first order and second order sideband components of the modulated upper sound carrier. Bandpass filter 141 is provided with a passband centered about the lower sound carrier center frequency $f_{s'}$ of 715.909 KHz., and sufficiently wider than the lower sound carrier's deviation range (e.g., extending ± 80 KHz. about $f_{s'}$) as to ensure passage of all first order and second order sideband components of the modulated lower sound carrier.

Bandpass filter 151 is provided with a bandpass characteristic described (in idealized form) by curve $s$ in FIG. 2. The passband of filter 151 thus extends between $f_{ps} - f_{vh}$ (1.3 MHz.) and $f_{pw} + f_{vh}$ (9.3 MHz.).

The respective outputs of the three bandpass filters 131, 141, 151 are applied via respective limiters (133, 143, 153) to respective FM demodulators (135, 145, 155). The output of the sound carrier FM demodulator 135 is filtered by a lowpass filter 137 (which, illustratively may incorporate appropriate audio deemphasis circuitry) to develop a first audio signal (e.g., a "left" channel stereo component) at output terminal A. The output of the sound carrier FM demodulator 145 is filtered by a similar lowpass filter 147 to develop a second audio signal (e.g., a "right" channel stereo component) at output terminal A'.

The output of the picture carrier FM demodulator 155 is applied to a lowpass filter having a passband of $0-f_{vh}$ (0–3.0 MHz.) to develop a composite color video signal at output terminal CV. Where it is desired to employ a conventional color television receiver for display of the recorded color pictures, it may be appropriate to convert the recovered composite color video signals from the buried subcarrier format, in which they appear at terminal CV, to a different format suitable for processing by the composite video signal processing circuitry of the receiver. A variety of arrangements suitable for such conversion are described, for example, in the aforementioned Pritchard patent.

For the aforesaid conversion purpose, the player apparatus of FIG. 3 includes video processing circuits 161 to which the signals at terminal CV are applied. Illustratively, the video signal processing circuit includes (1) a first comb filter (with a multiplicity of rejection notches at odd multiples of half the line frequency $f_H$) to obtain a luminance signal substantially free of chrominance components, and (2) a second comb filter (with a multiplicity of rejection notches at even multiples of half the line frequency) to free the band occupied by the chrominance component of luminance components.

The luminance signal output of the first comb filter is desirably subjected to an appropriate video deemphasis characteristic prior to delivery to a luminance signal output terminal L of the processing circuits 161. Associated with the second comb filter is apparatus for shifting the band occupied by the chrominance component to a new location outside the video passband of $0-f_{vh}$, as described, for example, in said Pritchard application. An illustrative value for the subcarrier frequency location ($f_{c'}$) in the new band is the NTSC value of 3.579545 MHz. The frequency shifted output of the second comb filter appears at a chrominance output terminal CC of processsing circuits 161, and is supplied therefrom to a bandpass filter 163 for restriction to the desired new band of $f_c \pm f_{dh}$ (e.g., approximately 3.58 MHz. ±500 KHz.). The output of bandpass filter 163 is combined with the luminance signals appearing at terminal L in an adder 165 to form a converted composite video signal output at the adder output terminal CV'.

Illustratively, the first comb filter of the processing circuits 161 is provided with a characteristic as partially shown by curve $x$ in FIG. 4. As indicated therein, the comb filtering action extends sufficiently below the color subcarrier frequency $f_c$ so as to provide rejection notches falling at the frequencies of the respective sound carrier center frequencies of $f_s$ and $f_{s'}$. The comb filtering effect is insignificant below an effective cutoff frequency $f_a$, lying below both sound carrier deviation ranges, with 400 KHz. being an illustrative value for $f_a$.

Reference may be made to the aforesaid Pritchard patent, as previously indicated, as well as to the copending application of John G. Amery, Ser. No. 506,446, filed Sept. 16, 1974, now U.S. Pat. No. 3,938,179, for detailed descriptions of a variety of forms of apparatus suitable for performing the above described functions of the conversion system 161, 163, 165.

In the above-described player apparatus of FIG. 3, the respective bandpass filters 131 and 141 preclude passage to the respective sound carrier FM demodulators (135, 145) of not only the instantaneous picture carrier frequencies but also all first order picture sideband components. The bandpass filters 131, 141 also reject color subcarrier sideband components appearing in any baseband video component subject to appearance in the output of pickup circuits 120. Possible picture signal interference with the desired multichannel sound reproduction is thus restricted to narrow bands of baseband luminance signal components in the 636–985 KHz. region. For most scenes, there is little likelihood of significant interference from such components; moreover, the likelihood may be further lessened by providing the recorder's luminance comb filter (i.e., filter 14, FIG. 1) with a downward extension of comb filtering action in the manner suggested by the characteristic $x$ of FIG. 4.

The bandpass filters 131 and 141 also serve to restrict noise input to the sound carrier FM demodulators to regions of the spectrum where disc noise, of both "background" and "defect" type, is relatively small (compared to spectral regions below 300 KHz., for example).

In the player apparatus of FIG. 3, the bandpass filter 151 precludes passage to the picture carrier FM demodulator 155 of the baseband sound carrier components. Bandpass filter 151 also bars passage of second harmonics of the picture carrier frequencies, and major sideband components thereof appearing during picture intervals. To the extent that duty cycle modulation use produces undesired amplitude modulation of picture carrier waves passed by filter 151, substantial stripping of the spurious amplitude modulation is effected by limiter 153.

In the instances where undesired phase modulation of picture carrier waves by sound carrier components occurs in the output of the pickup circuits 120, and sound carrier components appear as interfering signals in the output of FM demodulator 155, the provision of a characteristic of the type described by curve $x$ (FIG. 4) for the luminance comb filter of the video signal processing circuits 161 will reduce the possible interfering effects of such signals in the luminance component output at terminal CL. Bandpass filter 163 will bar fundamental and third harmonic components of such interfering sound carrier signals from appearance in the chrominance band of the converted composite video output at terminal CV', while the chrominance comb filter of video signal processing circuits 161 will reduce the possible interference with display coloring engendered by second harmonics of such interfering sound carrier signals.

Lowpass filter 157 prevents passage to the composite video signal output terminal CV (and the conversion apparatus coupled thereto) of beats that may be developed between the sound and picture carriers of the recovered signals During picture intervals, lowpass filter 157 also serves to bar passage of beats that may be developed between the picture carrier and the chrominance signals of a baseband component in the recovered signals.

In the use of the recovered composite color video signals to provide a color image display, as may be effected, for example, by providing suitable means for supplying the signals at terminal CV' to an appropriate input of a conventional color television receiver, an interlacing effect will moderate the visibility of a display pattern resulting from residual sound carrier component appearance in the receiver's luminance channel, due to the chosen relationships between sound carrier center frequencies and picture line frequency.

Where the respective outputs at terminals A and A' are the illustrative stereo signal components, they may be supplied, for example, via separate amplifying channels to appropriately located loudspeakers to provide the desired stereo sound reproduction effects.

In some recording instances, it may be desired to provide a monophonic sound accompaniment for the recorded color pictures, with identical audio signals supplied by sources 30, 40 (FIG. 1) to the respective modulators 32, 42. To accommodate such monophonic recordings (and, additionally, to facilitate monophonic reproduction of stereo recordings when desired), the player apparatus of FIG. 3 desirably includes suitable means, such as a simple resistance adder, to combine the outputs from terminals A and A'. Illustratively, the output of such adder, may serve as the audio input (with signals from terminal CV' as the video input) to transmitter apparatus of the general form described in U.S. Pat. No. 3,775,554, issued to Bernard Hjortzberg on Nov. 27, 1973, when it is desired to supply the video player output to the antenna terminals of a conventional color television receiver for display and monophonic sound reproduction purposes.

The approach of the present invention to multichannel sound accompaniment for picture recordings may be extended beyond the two-channel examples specifically considered above to accommodation of a greater number of channels. For example, a quadraphonic sound accompaniment may be employed, with two additional audio signals caused to frequency modulate two additional sound carriers, and the additional modulator outputs supplied as further inputs to adder 52 (FIG. 1). Illustrative choices for the additional sound carrier center frequencies are 558.566 KHz. ($71f_{H/2}$) and 416.958 KHz. ($53f_H/2$), and an illustrative deviation range width for the additional sound carriers is ±25 KHz. The narrower deviation range width is appropriate for these additional sound channels because their locations fall in less favorable regions of the disc noise spectrum than do the previously discussed $f_s, f_{s'}$ locations. Care should also be exercised in choice of the additional sound carrier center frequencies to avoid a subharmonic relationship with the buried subcarrier frequency $f_c$.

It should be noted that the specific frequency choice illustrations above presented, as well as those presented in the discussion of FIG. 2, represent frequencies desirably attained upon disc playback at the intended playback rotation rate for the disc. Where "real time" recording is employed in the recording process, the same specific frequencies are appropriate for use in development of the recording signal. However, where required, for example, by limitations on recording beam intensity or resist sensitivity, a slower-than-real-time recording mode may be employed, with the recording disc rotation rate a fraction (e.g., (1/20)) of the intended playback disc rotation rate. In such instances, the illustrative recording signal parameters are subject to division by the involved time expansion factor (e.g., 20).

What is claimed is:

1. A color-picture/multichannel sound record comprising:

a disc having a spiral groove in a surface thereof, said groove containing an information track comprising variations in the geometry of the groove bottom along a plurality of convolutions of said spiral groove;

said groove bottom geometry variations comprising alternations between a first cross-sectional shape for the groove in which the groove bottom and adjacent groove walls define a continuous smooth curve, and a second crosssectional shape in which the groove bottom is depressed relative to the groove bottom level associated with the first cross-sectional shape;

wherein the rate of recurrence of the groove bottom depressions varies along a groove convolution in accordance with the recorded picture information inclusive of luminance and chrominance components;

wherein the ratio of the groove length of a depressed groove bottom region to the groove length of the succeeding non-depressed groove bottom region varies along a groove convolution in accordance with the sum of first and second cyclical variations of respectively different rates; the rate of said first cyclical variations being subject to variation in accordance with the first aspect of the recorded second information, and the rate of said second cyclical variation being subject to variation in accordance with a second aspect of the recorded sound information; and wherein the respective rates of said first and second cyclical variations lie below the lowest frequency of said chrominance component but above half said lowest chrominance component frequency.

2. A record in accordance with claim 1:

wherein the variation of said rate of recurrence of the groove bottom depressions along a groove convolution is representative of a composite color video signal including a luminance signal component occupying a given band of frequencies, and a chrominance signal component in the form of a modulated color subcarrier and occupying a midband portion of said given band, and a sync signal component comprising respective sync pulses recurring at respective line and field rates;

wherein the rate of said first cyclical variation varies about a first center rate in accordance with said first aspect of the recorded sound information, said first center rate corresponding to a first odd multiple of half said line rate;

wherein the rate of said second cyclical variation varies about a second center rate in accordance with said second aspect of the recorded sound information, said second center rate corresponding to a second odd multiple of half said line rate; and wherein the frequency of said color subcarrier corresponds to a third odd multiple of half said line rate.

3. A color-picture/stereo-sound record comprising:

a disc having a surface coated by a first layer of conductive material and a second layer of dielectric material overlying said first layer;

said disc having a spiral groove in said coated surface, said groove containing an information track comprising variations in the geometry of the coated groove bottom along a plurality of convolutions of said spiral groove;

said groove bottom geometry variations comprising alternations between a first cross-sectional shape for the groove in which the coated groove bottom and adjacent coated groove walls define a continuous smooth curve, and a second cross-sectional shape in which the coated groove bottom is depressed relative to the coated groove bottom level associated with the first cross-sectional shape;

wherein the rate of recurrence of the groove bottom depressions varies along a groove convolution in accordance with the recorded picture information inclusive of luminance and chrominance components;

wherein the ratio of the groove length of a depressed groove bottom region to the groove length of the succeeding non-depressed groove bottom region varies along a groove convolution in accordance with sum of first and second cyclical variations of respectively different rates; said first cyclical variation rate varying along the groove convolution in accordance with a first stereo signal component of the recorded sound information, and said second cyclical variation rate varying along the groove convolution in accordance with a second of the recorded sound information; and wherein both of said first and second cyclical variation rates lie below the lowest frequency of said chrominance component but above half said lowest chrominance component frequency.

4. A record in accordance with claim 3;

wherein the variations of the rate of recurrence of the groove bottom depressions along a groove convolution are representative of a composite color video signal comprising the combination of (1) a chrominance signal having component frequencies substantially confined to a group of equally spaced spectral locations within a given band of frequencies and (2) a luminance signal having a first portion with component frequencies within said given band but substantially confined to a second group of equally spaced spectral locations bearing an interleaved relationship to said first group of spectral locations, and additional portions with component frequencies respectively above and below said given band.

5. A record in accordance with claim 4:

wherein said recorded picture information is representative of lines of picture information having a predetermined line rate; and wherein the respective rates of said first and second cyclical variations, responsive to respective aspects of the recorded sound information, vary within respective ranges which are centered about respectively different odd multiples of half said predetermined line rate.

6. A record in accordance with claim 5 wherein said respectively different odd multiples of half said predetermined line rate, about which said respective ranges are centered, are disposed below said given band in such spectral locations that the respective third harmonics thereof fall above said given band.

7. Playback apparatus, for use with a disc record having a spiral groove containing an information track in the form of a succession of groove bottom geometry variations representative of associated color picture and stereo sound information components, said color picture information components representing color pictures analyzed at predetermined line and field rates and including respective luminance and chrominance components, said playback apparatus comprising the combination of:

means including a record supporting turntable for rotating said disc record;

means, comprising a stylus having a groove-entering tip including a conductive electrode, for developing capacitance variations representative of the successive groove bottom geometry variations in the information track of said record under conditions of groove reception of said stylus tip and rotation of said record;

capacitance variation detecting means coupled to said stylus for developing, in response to said capacitance variations, an impulse train having a relatively high repetition rate which varies in accordance with said color picture information components and having a duty cycle which varies in accordance with the sum of first and second sound carrier waves separated in frequency; said first carrier wave varying about a first center frequency in accordance with the amplitude of a first stereo sound information component, and said second carrier wave varying about a second center frequency in accordance with the amplitude of a second stereo sound information component said first and second center frequencies corresponding to different odd multiples of half said predetermined line rate;

first bandpass filter means responsive to the output of said detecting means and having a passband centered about said first center frequency and encompassing the variation range for said first sound carrier wave to the exclusion of the variation range for said second sound carrier wave, and to the exclusion of the variation range for said relatively high repetition rate;

first FM demodulator means responsive to the output of said first bandpass filter means, for recovering said first stereo sound information component;

second bandpass filter means responsive to the output of said detecting means and having a passband centered about said second center frequency and encompassing the variation range for said second sound carrier wave to the exclusion of the variation range for said first sound carrier wave, and to the exclusion of the variation range for said relatively high repetition rate;

second FM demodulator means, responsive to the ouput of said second bandpass filter means, for recovering said second stereo sound information component;

third bandpass filter means responsive to the output of said detecting means and having a passband encompassing the variation range for said relatively high repetition rate to the exclusion of the variation ranges for said first and second sound carrier waves;

third FM demodulator means, responsive to the output of said third bandpass filter means, for recovering said color picture information components; and means, responsive to the output of said third FM demodulator means, for separating said luminance and chrominance components.

8. Apparatus in accordance with claim 7 wherein said chrominance component comprises a modulated color subcarrier occupying a given band of frequencies above the variation ranges of both said first and second carrier waves, the frequency of said color subcarrier corresponding to an odd multiple of half said predetermined line rate; and wherein said separating means includes:

means, responsive to the output of said third FM demodulator means, for passing said luminance component to the substantial exclusion of said chrominance component; said luminance component passing means including means for subjecting the output of said third FM demodulator means to a comb filter characteristic having multiple rejection notches occurring at different odd multiples of half said predetermined line rate and recurring within a band of frequencies encompassing said given band and both of said variation ranges.

9. Apparatus in accordance with claim 8 wherein said separating means also includes:

means, responsive to the output of said third FM demodulator means, for passing said chrominance component to the substantial exclusion of said luminance component;

said chrominance component passing means including, in cascade: (a) means for subjecting the output of said third FM demodulator means to a second comb filter characteristic having multiple rejection notches occurring at different even multiples of half said predetermined line rate; and (b) fourth bandpass filter means with a bandwidth corresponding to the width of said given band.

10. Playback apparatus, for use with a disc record having a spiral groove containing an information track in the form of a succession of groove bottom geometry variations representative of associated color picture and stereo sound information components, said color picture information components including a luminance component and a chrominance component, said playback apparatus comprising the combination of:

means including a record supporting turntable for rotating said disc record;

means, comprising a stylus having a groove-entering tip including a conductive electrode, for developing capacitance variations representative of the successive groove bottom geometry variations in the information track of said record under conditions of groove reception of said stylus tip and rotation of said record;

capacitance variation detecting means coupled to said stylus for developing, in response to said capacitance variations, an impulse train having a relatively high repetition rate which varies in accordance with said color picture information components and having a duty cycle which varies in accordance with the sum of first and second sound carrier waves separated in frequency; said first carrier wave varying about a first center frequency in accordance with the amplitude of a first stereo sound information component, and said second carrier wave varying about a second center frequency in accordance with the amplitude of a second stereo sound information component;

first bandpass filter means responsive to the output of said detecting means and having a passband centered about said first center frequency and encompassing the variation range for said first sound carrier wave to the exclusion of the variation range for said second sound carrier wave, and to the exclusion of the variation range for said relatively high repetition rate;

first FM demodulator means responsive to the output of said first bandpass filter means, for recovering said first stereo sound information component;

second bandpass filter means responsive to the output of said detecting means and having a passband centered about said second center frequency and encompassing the variation range for said second sound carrier wave to the exclusion of the variation range for said first sound carrier wave, and to the exclusion of the variation range for said relatively high repetition rate;

second FM demodulator means, responsive to the output of said second bandpass filter means, for recovering said second stereo sound information component;

third bandpass filter means responsive to the output of said detecting means and having a passband encompassing the variation range for said relatively high reptition rate to the exclusion of the variation ranges for said first and second sound carrier waves;

third FM demodulator means, responsive to the output of said third bandpass filter means, for recovering said color picture information components; and means, responsive to the output of said third FM demodulator means, for separating said luminance and chrominance components.

11. In a playback system for a color-picture multichannel-sound disc record having a groove containing an information track containing a succession of groove bottom geometry variations representative of recorded luminance, chrominance and first and second information components, the method of separately recovering from said record said first and second sound information components and said luminance and chrominance information components comprising the steps of:

establishing capacitance variations successively representative of said succession of groove bottom geometry variations in said disc record groove;

converting said capacitance variations to voltage variations in the form of an impulse train having a relatively high repetition rate varying in accordance with the combination of said luminance and chrominance information components, and having a duty cycle subject to variation in accordance with the sum of first and second carrier waves of different, relatively low, frequencies, the first carrier wave frequency varying in accordance with said first sound information component; and the second carrier wave frequency varying in accordance with said second sound information component;

separately deriving from said impulse train a high frequency FM carrier wave and respective first and second low frequency FM carrier waves; and separately demodulating the respective high frequency and low frequency FM carrier waves to respectively recover (a) said combination of luminance and chrominance information components, (b) said first sound information component, and said second sound information component; and separating the respective luminance and chrominance information components from said recovered combination.

12. In a video disc recording system, the combination comprising:

a source of composite video signals having predetermined line and field frequencies, and including a chrominance component;

a first source of audio signals;

means for deviating the frequency of a first carrier about a first, relatively low center frequency in accordance with the amplitude of audio signals from said first audio signal source;

a second source of audio signals;

means for deviating the frequency of a second carrier about a second, relatively low, center frequency in accordance with the amplitude of audio signals from said second audio signal source;

means for modulating the frequency of a third carrier over a deviation range encompassing relatively high frequencies in accordance with the amplitude of composite video signals from said composite video signal source;

means for summing a frequency modulated carrier wave output of said first carrier frequency deviating means, a frequency modulated carrier wave output of said second carrier frequency deviating means, and a frequency modulated carrier wave output of said third carrier frequency modulating means to form a combination signal; and a limiter responsive to said combination signal formed by said summing means for developing a recording signal.

13. Apparatus in accordance with claim 12 wherein the respective outputs of said first and second carrier frequency deviating means which are supplied to said summing means each have a peak-to-peak amplitude which is small relative to the peak-to-peak amplitude of the frequency modulated carrier wave output of said third carrier frequency modulating means which is supplied to said summing means; and wherein said first and second center frequencies substantially correspond to respectively different odd integral multiples of half of said predetermined line frequency.

14. Apparatus in accordance with claim 13 wherein said chrominance component comprises a modulated color subcarrier and occupies a midband location in the frequency spectrum of said composite signals;

wherein the frequency of said color subcarrier substantially corresponds to an odd integral multiple of said predetermined line frequency; and wherein said first and second center frequencies lie below the midband region of the frequency spectrum occupied by said chrominance component.

15. Apparatus in accordance with claim 14 wherein said first and second center frequencies lie above half the lowest frequency of said chrominance component; and wherein the spectral locations of said first and second center frequencies are such that the respective third harmonics thereof fall above said midband region occupied by said chrominance component.

16. In a recording system for a color-picture stereosound record, the method of developing a recording signal which comprises the steps of:

a. developing (1) a composite color video signal representative of color images to be recorded, and inclusive of a chrominance component occupying a given frequency band and (2) a pair of audio signals representative of a stereo sound accompaniment for the color images to be recorded;

b. modulating the frequency of a first carrier over a first, relatively low frequency, deviation range, lying below said given frequency band but above half the lowest frequency of said given band, in accordance with one of said pair of audio signals, while modulating the frequency of a second carrier over a second, relatively low frequency, deviation range, also lying below said given frequency band but above half the lowest frequency of said given band, in accordance with the other of said pair of audio signals;

c. modulating the frequency of a third carrier over a third, relatively high frequency, deviation range in accordance with the said composite color video signal;

d. combining the first and second frequency modulated carriers with the third frequency modulated carrier to form a combination signal; and e. limiting said combination signal to form a recording signal.

17. In a video disc recording system, the combination comprising:

a source of composite color video signals having predetermined line and field frequencies, and including a chrominance component comprising a modulated color subcarrier, wherein the subcarrier frequency corresponds to a first odd multiple of half of said predetermined line frequency;

an audio signal source having first and second stereo signal component outputs;

means for modulating the frequency of a first carrier over a first low frequency deviation range in accordance with the amplitude of said first stereo signal component output of said audio signal source, said first deviation range being centered about a second odd multiple of half of said predetermined line frequency;

means for modulating the frequency of a second carrier over a second low frequency deviation range, in accordance with the amplitude of said second stereo signal component output of said audio signal source, said second deviation range being centered about a third odd multiple of half said predetermined line frequency;

means for modulating the frequency of a third carrier over a predetermined high frequency deviation range in accordance with the amplitude of said composite color video signals;

means for adding together a frequency modulated carrier wave output of said first carrier modulating means, a frequency modulated carrier wave output of said second carrier modulating means, and a frequency modulated carrier wave output of said third carrier modulating means to form a combination signal; and a limiter responsive to said combination signal formed by said adding means for developing a recording signal.

18. Apparatus in accordance with claim 17 wherein said first and second deviation ranges lie below the lowest frequency of said chrominance component but above half said lowest chrominance component frequency.

19. Apparatus in accordance with claim 17 wherein said high frequency deviation range is disposed so that the frequency of said third carrier, when the amplitude of said composite color video signals is representative of black, is separated from said subcarrier frequency by a frequency substantially corresponding to the highest video signal frequency provided by said source.

* * * * *